June 20, 1950 W. LYONS 2,512,462

DIVERSITY SYSTEM

Filed Feb. 20, 1946 2 Sheets-Sheet 1

INVENTOR
Walter Lyons
BY H. G. Grover
ATTORNEY

DIVERSITY SYSTEM

Filed Feb. 20, 1946

2 Sheets-Sheet 2

INVENTOR
Walter Lyons
BY H. G. Grover
ATTORNEY

UNITED STATES PATENT OFFICE 2,512,462

DIVERSITY SYSTEM

Walter Lyons, Bayside, N. Y., assignor to Radio Corporation of America, a corporation of Delaware Application February 20, 1946, Serial No. 648,965

6 Claims. (Cl. 250—8)

Figure 1:
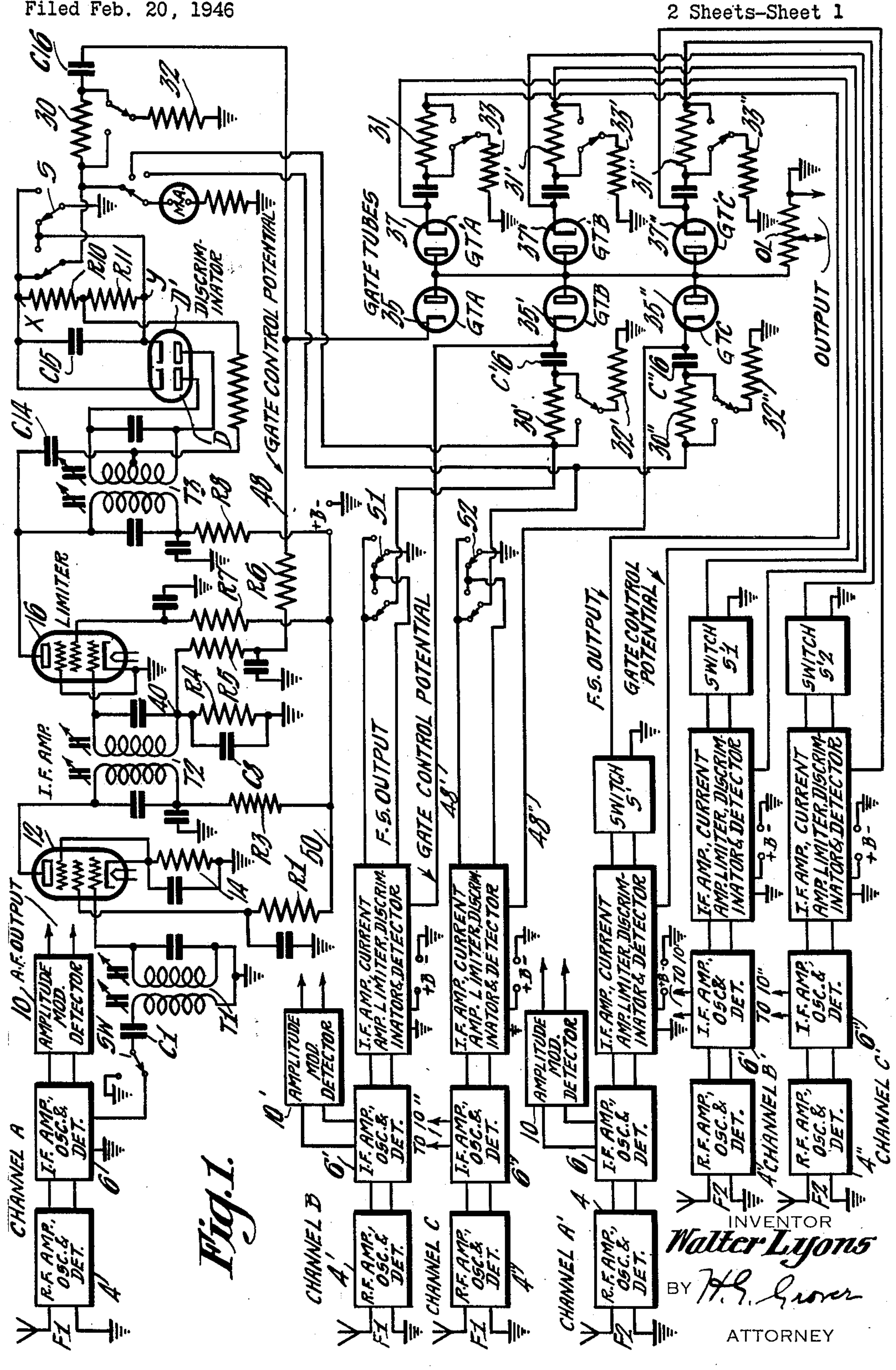

This application relates to diversity receiver systems in general and in particular to receivers of telegraphy or teletype signals or facsimile signals and the like. The telegraphy, teletype or facsimile signals may be of the on-off (amplitude modulation) type, or of the frequency shift type, and when the latter type signals are used the carrier may be also amplitude modulated, provided the frequency shift is not too great.

In certain known space diversity systems means is provided to use signal only from that receiver wherein the best signal appears and to render the receivers which are responsive to the remaining signals, which are not the best signals, ineffective to contribute to the output. The improvement disclosed in this application is applicable to diversity systems of this general type.

In diversity receiver stations known in the art today, there are usually two or more separate and complete diversity receiver systems operating at somewhat widely separated frequencies, one being the frequency which practice has proven has the best day time propagation characteristic, the other being the frequency which practice has proven has the best night time propagation characteristic, (both choices being limited of course to frequency ranges approved by the FCC). The receivers are alternately or simultaneously operative and when the operativeness is alternative that receiver is selected for use which is operating at the frequency which the operator thinks is least affected by fading and similar defects caused by multipath propagation, etc. In general it may be said that the higher frequency wave is most effective during daylight hours, and that the lower frequency wave is more effective during the hours of darkness. One of these diversity systems then is selected by the operator to supply output for a tape recorder or a teletype machine or in some cases for rebroadcast purposes.

When the known diversity systems are used with a tape recorder both systems may be put into operation and may each supply output, but only one tape message is made use of. The operator has the burden of determining which of the two tapes coming out of the keying machines has the least errors and of selecting that one as the signal version to be used. The operator may then shut off that diversity system which he thinks has the worst signal. It will be obvious that since fading effects are random with respect to time, space and frequency, this selection by the operator may not result in use of the best signal. Moreover, it is based on the operator's judgment, which may not be good. As stated above, propagation characteristics of radiant energy of high frequencies are better than those of low frequencies in daylight hours. During twilight hours the characteristics may shift from moment to moment and it is very difficult for the operator, even with the two tapes at hand, to decide which signal is best. Obviously, the poorest signal is in many cases used for varying lengths of time.

If a selected one of the diversity receivers is operating a teletypewriter machine then the operator does not even have the two tapes to inspect and compare. The operator has no way of comparing the reception characteristics of the two systems. Thus he has no recourse but to arbitrarily select one diversity system and disconnect the other.

If the signal is being rebroadcast the operator has no way of ascertaining which is the best signal except possibly the round-about way of recording the signal or a portion thereof received by each diversity system, comparing the same, then selecting output from only the diversity system which he considers has the best signal.

The primary object of my invention is to provide a diversity terminal comprising two or more diversity receiver systems, so arranged that output is automatically taken from that system getting the best signal, and furthermore from that receiver, of the system selected, which is supplying the best signal. In other words, in my improved method and means frequency diversity effects are made use of as well as space diversity effects. Then the recording apparatus or teletype machine or rebroadcast system will automatically and continuously be supplied with output from that system operating at the frequency most appropriate for use at different hours throughout the entire day. The operator may then, after the propagation characteristics have definitely changed, and at his convenience, if he desires, shut off that receiver system operating at the frequency most affected adversely during propagation by multipath transmission, etc.

Briefly, this object is attained by providing at each terminal at least two space diversity systems operating at different frequencies and so arranging the systems that that receiver in each system getting the best signal renders the other receivers ineffective, and that system including the selected receiver renders the other system ineffective. In a particular arrangement a load impedance, common to the outputs of the receivers of the two diversity systems, operating at different frequencies best suited for different times of the day, is so arranged that the receiver of each system getting the best signal blocks off the other receivers of that system, while the diversity system including said receiver blocks off the other diversity system.

Figure 2:
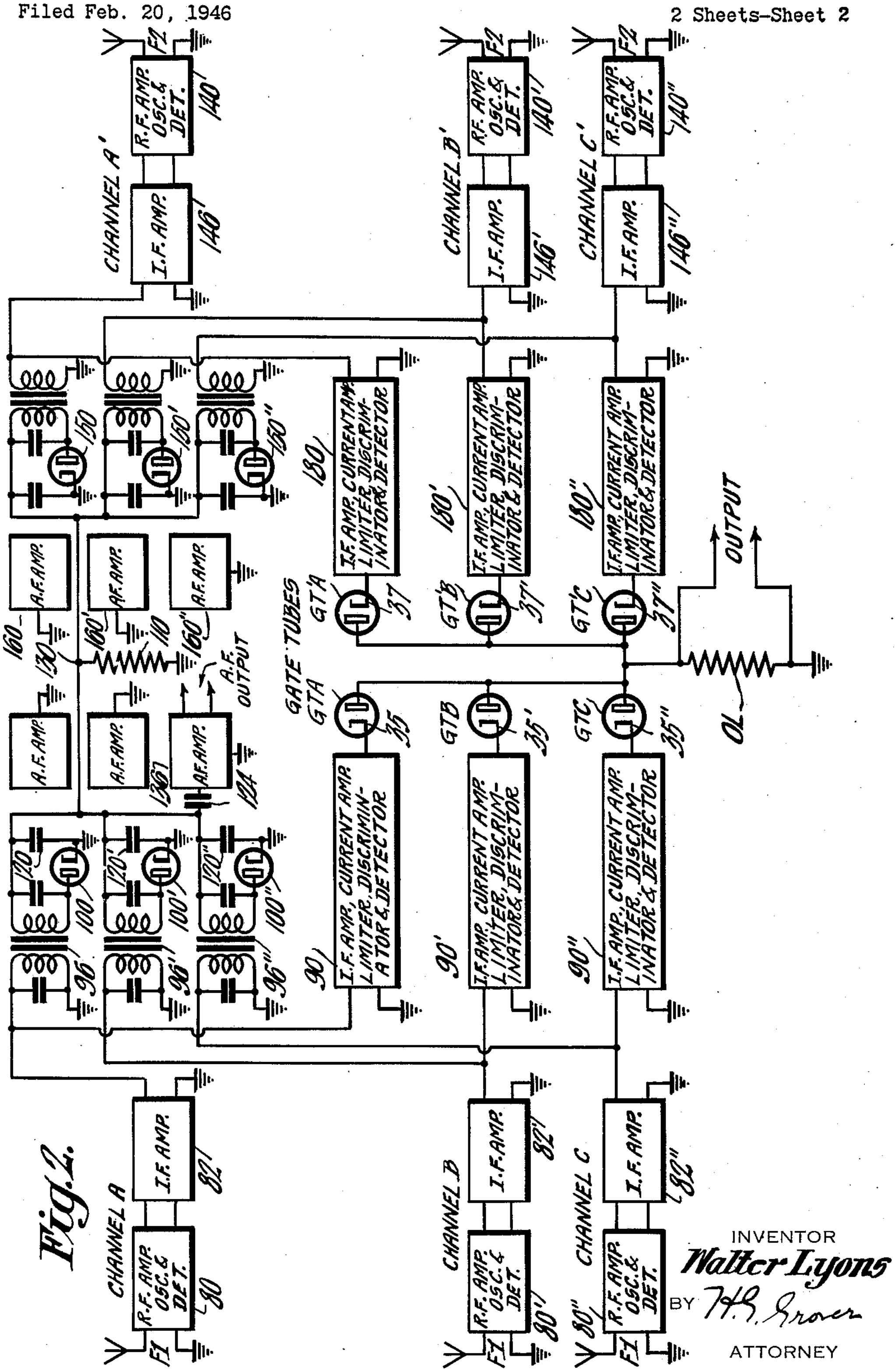

In describing my invention in detail reference will be made to the attached drawings wherein Fig. 1 illustrates partly by block diagram and partly by circuit element and circuit element connection a diversity system arranged in accordance with my invention, and Fig. 2 illustrates partly by block diagram and partly by circuit element and circuit element connection a modification of the arrangement of Fig. 1. In Fig. 2 the received signal may comprise an amplitude modulated carrier which is also shifted in frequency in accordance with telegraphy, facsimile, or similar signals. The amplitude modulation may be in accordance with telephone signals or telegraphy signals.

A diversity system arranged in accordance with my invention comprises two or more diversity receiving systems operating at different frequencies, one say appropriate for daylight hours and the other appropriate for use during hours of darkness. The diversity systems operating at the two frequencies may each comprise a plurality of receivers, at least two, three being used in the particular embodiment being described. Each diversity system makes use of three similar receivers. The receivers in one system are represented generally as channels A, B and C in Fig. 1. The channels are similar and only a part of channel A thereof is shown in detail. The other two channels B and C are shown entirely by the use of rectangles. The other diversity system comprises three similar chanels designated generally A′, B′ and C′. These channels operate at an input radio frequency F2, whereas the channels A, B and C operate at an input radio frequency F1.

The three channels A, B and C operate on gating tubes GTA and GTB and GTC in a manner which will be described hereinafter to make available at the output load OL, signals which are derived from that channel having output excited by the best signal. The three channels A′, B′ and C′ likewise feed through gating tubes GT′A, GT′B and GT′C to the common load OL, so that the output is further derived from that diversity system operating at the frequency F1 or F2 which is least affected by fading and is supplying the best signal.

In channel A the radio frequency amplifier converter and intermediate frequency amplifier may be of a well known type and are preferably of a type known to employees of applicant's assignee as DR89. It may include in a unit 4 a radio frequency amplifier, a local oscillator and a detector used for amplifying and converting the radio frequency signal which may be shifted in frequency in accordance with signals to a lower frequency for amplification in an intermediate frequency amplifier 6. The carrier as stated above may be amplitude modulated as well as modulated in frequency, in which case some of the output may be selected from the IF stages in 6 and supplied for amplification and detection and audio frequency amplification in the unit 10. The output from this unit 10 may be used as desired.

The IF output of unit 6 is fed through condenser C1 to the primary winding of a transformer T1, the tuned secondary winding of which is connected to the control grid of an amplifier tube 12. The cathode of tube 12 is grounded through a biasing resistor and bypass condenser unit 14 to thereby complete the input circuit through the secondary winding of the transformer T1, one end of which is grounded. The anode of tube 12 is coupled to the tuned primary winding of transformer T2, the tuned secondary winding of which is coupled to the control grid of an amplifying limiter 16. This amplifying limiter has its cathode and suppressor grid directly grounded while one end of the secondary winding of the transformer T2 is connected to ground by a biasing unit comprising a grid resistor R4 shunted by a condenser C8. The transformers T1 and T2 may be of the tunable iron core type and have band pass characteristics sufficiently wide to pass without material attenuation all frequencies covering a band including mark and space frequencies, which may be separated by a frequency band of several hundred cycles.

The anode of the amplitude limiter tube 16 is coupled to the tuned primary winding of a transformer T3 having a tuned secondary winding coupled differentially to the anodes of a pair of diodes D and D′. The diodes may be in separate envelopes but in the embodiment illustrated are in a single envelope. The anode of the limiting amplifier tube 16 is also coupled to the electrical center of the secondary winding of the transformer T3 by a coupling condenser C14. The cathodes of the diodes D and D′ are differentially coupled to the load comprising resistors R10 and R11 shunted by an IF bypass condenser C15. A point between resistors R10 and R11 is coupled to the electrical center of the secondary winding of transformer T3 to complete the differential direct current circuits of the rectifier system. The coupling of the limiter to the frequency discriminator is in accordance with the teaching of Seeley, U. S. Patent #2,121,103. This discriminator circuit is well known in the art and serves to convert the frequency shifts in accordance with the telegraphy signals into corresponding amplitude variations which are demodulated in detectors D and D′ to appear across the load including resistors R10 and R11. If the frequency of the energy input to the discriminating transformer T3 is centered on the cross-over point of the sloping characteristic of the discriminator equal potentials appear at the points X and Y. If the frequency of the input to the transformer T3 goes up the potential at one of the points X or Y will increase or become more positive, while the potential at the other point will decrease or become less positive. Conversely, if the frequency of the input energy goes down the variation described in the preceding sentence is reversed. The signal pulses at the demodulator output are supplied to a polarity reversing switch S and from the switch S to the cathode of the channel A gate tube GTA. The purpose of the switch S is to relate the potential fed to the cathode of the gate tube GTA to the mark and space frequencies as desired. For example, if on mark the potential at the point X rises, the potential at the point Y falls. If the switch S is then in the position shown the rising potential at the point X will be applied to the gate tube GTA so that on mark frequency the potential at the gate tube GTA becomes more positive. In practice, the mark condition may be represented by the higher frequency and the space condition by the lower frequency. If for some reason the transmitter reverses this condition, such reversal may be corrected by changing the position of switch S. Reversal of the condition mentioned above may also result from operation of the receiver in such a manner that the wrong intermediate frequency side band is supplied to the discriminator.

To continue the description of the channel A, assume that the gate tube GTA is open, i. e., conductive. The signal supplied from the switch S is impressed through the resistance unit 30 to the cathode 35 of the gate tube GTA and thence to the load OL and from the load to any output utilization circuit such as, for example, a tone keyer or a teletype machine. The signal potentials at 35 are proportional to the amount of frequency shift; therefore for large shifts resistors 30 and 32 form a potentiometer to reduce this potential. If the potential due to the signal is too high it will counter the gating potential, which depends only on signal intensity, and diversity action will not take place properly.

The point 40 at the grid end of resistor R4 is connected by resistor R5 and resistor R6 and lead 48 to the cathode 35 of the gate tube GTA. This lead supplies the gating control potential arranged to make conductive that gate tube coupled to the channel getting the best signal at frequency F1. Positive direct current potentials are supplied, from sources not shown, to the screen grids of tubes 12 and 16 by resistors R1 and R7 and to the anodes of tubes 12 and 16 by resistors R3 and R8.

In operation the switch SW is closed in the position shown, and in an embodiment IF energy or current at about 455 kc. plus and minus the frequency shift FS is fed by coupling condenser C1 to the transformer T1. The frequency shift FS may be a total of 850 cycles. The tube 12 operates as a Class A amplifier and amplifies the frequency shifted current which as amplified is impressed on the primary winding of transformer T2 to excite the grid of the voltage amplitude limiter stage 16. Grid limiting takes place in this stage. Say, for example, in the presence of signalling currents, due to grid rectification the potential at the point 40 varies from −5 to −30 volts, depending on the carrier strength. The degree of amplification of amplifier 16 is decreased due to the negative biasing potential it generates thereby maintaining nearly uniform voltage across the primary of T3. The limiter is driven beyond saturation by the positive peaks to thereby accomplish limiting on the positive swings. The limiter stage is driven beyond cutoff by the negative swings so that full wave limiting takes place.

The limited, frequency-shifted intermediate frequency voltage is supplied to the discriminator including T3 and C14 wherein it is converted to amplitude variations in voltage, wherein the amplitude variations in voltage correspond to the frequency shifts in accordance with signals. The diode detectors D and D′ rectify the amplitude variations to supply at the point X say in the switch position shown about plus and minus 4 volts, i. e., about one volt per hundred cycles shift in each direction about center frequency. If unequal direct current potentials appear at the points X and Y as indicated in the meter MA, the discriminator circuits are each tuned to place the cross-over point of the discriminator characteristic at a point substantially intermediate the extremes of the frequency shift, i. e., the frequencies representing mark and space.

The potential variations at the point 40 are inversely related to the carrier strength since as the carrier grows stronger the potential at the point 40 becomes more negative. This varying potential is supplied by resistors R5 and R6 to the cathode 35 of the gate tube GTA. As the signal strength at T2 grows the negative potential at the cathode 35 of the gate tube GTA grows so that this tube becomes conductive to pass output supplied through switch S and condenser C16 to the cathode of tube GTA. The resistor R6 has as a function supplying the impedance to raise the cathode 35 of the tube GTA above ground. The resistors R6 and R5 may be considered a noise and signal filter between the cathode of the gating tube and limiter load R4 with a potential supply at the point 40. The keyed energy supplied by the gating tube GTA appears across the output impedance OL for use as desired. When the signal is supplied by the gate tube GTA it flows through the resistor OL so that the anode end of said resistor becomes more negative, thereby making the anodes of the gate tubes GTB and GTC less positive to more effectively cut these tubes off, or block the same so that the other receivers getting a signal of less strength than that picked up by the receiver in channel A are blocked off. In this manner the signal is taken from that receiver getting the best signal.

The operation of the amplifier 12, limiter 16, discriminator T3, C14, detectors D and D′, and the gate control are substantially as in my U. S. application Serial #578,877, filed February 20, 1945, which has now ripened into Patent #2,503,957, dated April 11, 1950. In said application, however, gas tubes are used for gating purposes.

The receivers of channel B and channel C operate at the frequency at which the receiver of channel A operates, and are similar in all respects to the receiver of channel A described in detail hereinbefore. In channels B and C where feasible, I have used numerals corresponding to the numerals used in channel A, with the numerals primed in channel B and double primed in channel C, and for that reason it does not seem necessary to describe channels B and C in detail.

At each station, as stated above, two diversity systems as described hereinbefore are supplied. The second diversity system operating at the other frequency F2 is shown herein entirely by rectangles at the left in Fig. 1 of the drawings. The channels A′, B′ and C′ each supply detected frequency shift signals to the respective gating tubes GT′A, GT′B and GT′C, all connected as described hereinbefore to the common output impedance OL. These receivers operate as described hereinbefore to tend to supply as output to OL a signal only from that receiver of the second system getting the best signal. The anodes of all of the gate tubes GTA, GTB, GTC, GT′A, GT′B and GT′C are connected together and to the common impedance OL. The strongest of the six individual signals, from the six separate receiver channels A, B, C, A′, B′, and C′, appearing at the corresponding one of the six gate tubes, makes the anode end of resistor OL more negative, thereby making the anodes of the five remaining weaker-signal gate tubes less positive to more effectively cut these tubes off or block the same. Therefore, the receivers in the other five channels getting a signal of less strength than that picked up by the receiver in the strongest-signal channel, for example channel A, are blocked off. In this manner, that receiver, in each of the two space diversity systems operating at different frequencies, getting the best signal renders the other receivers in the corresponding system ineffective, and also that system including the selected receiver renders the other system ineffective. Thus it will be seen that during times when the operator is not certain which frequency F1 or F2 is coming in the best, he may let all of the receivers operate as described hereinbefore to supply output not only from the receiver of each diversity system which has the best signal but also from that receiver of both diversity systems which has the best signal. Thus during periods of twilight when first one frequency and then the other comes in with less fading, the operator is assured of having for use the best signal received on frequencies F1 and F2. Once the operator is certain that one of the frequencies is most effective continuously, he may, if desired, disconnect or turn off the other diversity system.

In the arrangement of Fig. 1, I have diversified the systems as to frequency shift signals only. Each receiver may include an amplitude modulation detector 10, the output of which may be used as desired. In the arrangement of Fig. 2, the systems are space and frequency diversified with respect to the amplitude modulation of the two frequencies, and also as to frequency shift or modulation of the two frequencies.

In the system of Fig. 2 then, unit 80 may represent the radio frequency amplifiers and converters of the unit 4 of Fig. 1. This unit 80 then includes radio frequency amplifiers, an oscillator, and a converter. An intermediate frequency amplifier 82 is connected with the converter in 80 and supplies output at intermediate frequency to the intermediate frequency amplifiers, limiters, and frequency shift discriminator and detectors 90, and also to amplitude modulation demodulating circuits including an IF transformer 96 which supplies an amplitude modulation detector in the form of a diode 100. The diode 100 detects the amplitude modulation which may be on the carrier energy and supplies the same to a common output impedance 110. The other channels are similarly connected with intermediate frequency transformers 96′ and 96″, in turn connected with diodes 100′ and 100″. The diodes have their anodes connected through the intermediate frequency secondaries of the transformers to the common load resistor 110 and to ground and back to the cathodes. The intermediate frequency transformers may be tuned as shown and the end of the secondary windings connected with the load impedance are grounded for energy of intermediate frequency by bypassing condensers 120, 120′ and 120″. One of the audio frequency amplifiers of one of the receivers, say 136, is coupled by a coupling and blocking condenser 124 to the high potential end of resistor 110. The remaining audio frequency amplifiers are not used in the system as now arranged.

The received signals may then be frequency shifted in accordance with telegraphy and also amplitude modulated in accordance with telephony or similar signals. The modulations appear on the intermediate frequency energy supplied to transformers 96, 96′ and 96″ for rectification in the diodes 100, 100′ and 100″. Assume that a strong signal comes in to transformer 96. The negative potential applied to the anode of the diode 100 due to current flowing in resistor 110 will be overcome. Rectification will take place and more current will flow in resistor 110 to increase the negative potential at the point 130. This negative potential will be applied to the anodes of all of the diodes so that only that diode getting a strong signal will rectify. When rectification takes place the audio frequency modulation on the carrier being rectified also appears at the point 130 and is supplied by the condenser 124 to the audio frequency amplifier 136, and in this manner the operator is using audio modulation derived from the signal appearing in the receiver getting the best signal. The other diversity receiver system at the right in Fig. 2 is similarly arranged and connected with the common load resistor 110. These channels A′, B′ and C′ each comprise a radio frequency amplifier and oscillator and detector 140, 140′ and 140″. They also include an intermediate frequency amplifier 146, 146′ and 146″. The intermediate frequency transformers have two outputs, one of which goes to the audio frequency modulation rectifiers 150, 150′ and 150″ which operate as described hereinbefore to supply across resistor 110 a direct current potential. This direct current potential biases the anodes of the diodes 150, 150′ and 150″ negative an amount such that it is overcome only in that diode receiving the strongest signal. Thus rectification is inhibited in the remaining diodes. The anodes of all of the diode rectifiers 100, 100′, 100″, 150, 150′ and 150″ are connected together and to point 130 of the common resistor 110. The strongest of the six individual signals, from the six separate receiver channels A, B, C, A′, B′, and C′, biases the anodes of the five remaining weaker-signal rectifiers negative amounts such that the biases are overcome only in that single diode receiving the strongest signal. Thus, rectification is inhibited in the five remaining diodes, so that that receiver, in each of the two space diversity systems, getting the best signal renders the other receivers in the corresponding system ineffective, and also that system including the selected receiver renders the other system ineffective. The audio modulations on the carrier F2 also appear across resistance 110 and at the input to the audio amplifier 136. The audio amplifiers 160, 160′ and 160″ need not be used in this arrangement since the audio amplifier 136 responds to the selected signal irrespective of which receiver of both groups gets the strongest signal.

In operation then I derive signals resulting from amplitude modulation from only that receiver of both diversity systems which picks up the best signal, because that diode of the two systems getting the best signals blocks all of the remaining diodes.

As to the frequency shift signals, the intermediate frequency amplifiers 90, 90′ and 90″ are similar to the ones described hereinbefore in connection with Fig. 1 and including tubes 12, 16, diodes D and D′, switch S, resistances 30, 32, with the gating control potentials produced and applied to the cathodes 35, 35′ and 35″, as described hereinbefore, to control gates GTA, GTB and GTC to supply output across load impedance OL. The intermediate frequency stages 180, 180′ and 180″ also include intermediate frequency amplifiers, current amplitude limiters, frequency discriminators, frequency shift detectors, switches S, resistance units 31, 33, etc., to operate as described hereinbefore to supply output only through that gating tube GT′A or GT′B or GT′C to the load OL derived from the receiver getting the best signal. Thus in this improved system of Fig. 2 I have both space diversity and frequency diversity and the effects are made use of with respect to the amplitude modulation on the carrier as well as the frequency shift modulation on the carrier. Here again the operator is assured of having the best audio frequency signal being received on both frequencies or diversity systems as well as the best frequency modulation signal being received on both diversity systems. The need of making a choice by inspection of recorded signals or by other more round-about methods is unnecessary. The operator may leave both systems operating until he is sure that one of the frequencies is continuously being received in a more effective manner than the other frequency being picked up by the other system, in which case the latter may be turned off.

In both modifications the signals of varying potential appearing across OL may be used as desired to operate a teletypewriter or other recorder directly after amplification as desired, or to operate a tone keyer which operates a teletypewriter or other recorder, or they may be rebroadcast. For example, they may be used as disclosed in Schock et al. U. S. application Serial #632,978, filed December 5, 1945.

What is claimed is:

1. In a signalling system to be used with two carriers of different frequency each modulated in frequency by the same signal, in combination, at least two diversity receiving systems each operating at a different frequency and each including a plurality of spaced signal pickup devices, separate signal amplifying and signal demodulating means coupled to each pickup device to form separate receivers, an electronic gating device coupled to each demodulating means, a common output impedance coupled to all of the gating devices, means for developing a potential in each receiver related to the intensity of the signal picked up by said receiver, and means for applying the potential developed in each receiver to the gating device therefor.

2. In a signalling system to be used with two carriers of different frequency each modulated by the same signal, at least two diversity receiving systems each operating at a different one of said frequencies and each comprising a plurality of receivers having their respective antennas spaced and operating at the same frequency, a modulation detector coupled to each antenna, a common load impedance for all of said detectors, means cooperating with said common load impedance and controlled by potentials developed therein for suppressing output from all of said detectors except that one coupled to the antenna getting the best signal, and means for deriving output from said common load impedance.

3. In a signalling system to be used with two carriers of different frequency each modulated in amplitude by the same signal and in frequency by a common signal which is different from said first signal, at least two diversity receiving systems each operating at a different one of said frequencies and each comprising two or more receivers having their respective antennas spaced and operating at the same frequency, an amplitude modulation detector coupled to each antenna, a common load circuit for all of said detectors, means cooperating with said common load circuit and controlled by potentials developed therein for suppressing output from all of said detectors except that one coupled to the antenna getting the best signal, a frequency discriminator and detector coupled to each antenna, a common load impedance for all of said last detectors, and means cooperating with said last mentioned load impedance for suppressing output from all of said last mentioned detectors except that one coupled to the antenna getting the best signal.

4. In a signalling system, in combination, a plurality of diversity receiving systems each comprising a plurality of spaced signal pickup devices coupled to signal amplifying and signal demodulating devices to form separate receivers, with the diversity systems operating at different frequencies, a common load impedance for all of the receivers of all of said diversity systems, means controlled by potentials developed in that receiver getting the best signal for supplying output to said impedance from the receiver getting the best signal, and means actuated by the potential developed across said load impedance for blocking output signal from each of the receivers except that one receiving the best signal.

5. In a system for receiving two different carrier currents of different frequencies modulated in amplitude in accordance with the same signal and both also shifted in frequency in accordance with another signal and for selecting for use energy of that carrier frequency which is least affected by fading during transmission, in combination, at least two diversity receiver systems each comprising a plurality of spaced signal pickup means, all of the signal pickup means of one system being tuned to the frequency of one of said carriers and all of the signal pickup means of the other system being tuned to the frequency of the other of said carriers, a plurality of amplitude modulation detectors in each receiver system, there being one for each signal pickup means, means for exciting each detector by current modulated in amplitude in accordance with the signals on the carrier energy in its pickup device, a common load circuit for all of said detectors, means cooperating with said common load circuit and controlled by potentials developed therein for blocking the output of all of the detectors except that detector receiving the best signal, a frequency modulation discriminator and detector for each pickup means in each system, an electronic gating device connected to each frequency modulation detector, a common load circuit for all of the gating devices, and means controlled by the intensity of the current received by the respective pickup means for turning on only that gating device connected to the frequency modulation detector for the pickup means getting the best signal.

6. Apparatus for receiving carrier currents of two different frequencies modulated in frequency in accordance with signals and for selecting for use that signal received on the strongest carrier current, comprising at least two diversity receiver systems each comprising a plurality of spaced signal pickup and amplifying means connected to form separate receivers, all of the signal pickup and amplifying means of one system being tuned to the frequency of one of said carriers and all of the signal pickup and amplifying means of the other system being tuned to the frequency of the other of said carriers, a frequency modulation discriminator and detector for each receiver in each system, an electronic gating device for each detector, a common load circuit for all of the gating devices and means controlled by the intensity of the carrier currents received by the respective receivers for turning on only that gating device connected with the detector of the receiver receiving the best signal.

WALTER LYONS.

REFERENCES CITED

The following references are of record in the file of this patent:

UNITED STATES PATENTS

| Number | Name | Date |
|---|---|---|
| 1,814,832 | Dome | July 14, 1931 |
| 1,934,211 | Schroter et al. | Nov. 7, 1933 |
| 2,070,418 | Beverage | Feb. 9, 1937 |
| 2,210,089 | Loughren | Aug. 6, 1940 |
| 2,249,425 | Hansell | July 15, 1941 |
| 2,253,867 | Peterson | Aug. 26, 1941 |
| 2,290,992 | Peterson | July 28, 1942 |
| 2,309,678 | Smith | Feb. 2, 1943 |
| 2,383,126 | Hollingsworth | Aug. 21, 1945 |
| 2,384,456 | Davey | Sept. 11, 1945 |
| 2,447,057 | Crosby | Aug. 17, 1948 |